Oct. 19, 1943.  W. H. ROWAND  2,331,932
THERMAL DRUM CONNECTION
Filed May 28, 1941   4 Sheets-Sheet 1

INVENTOR.
Will H. Rowand
BY  Attorney

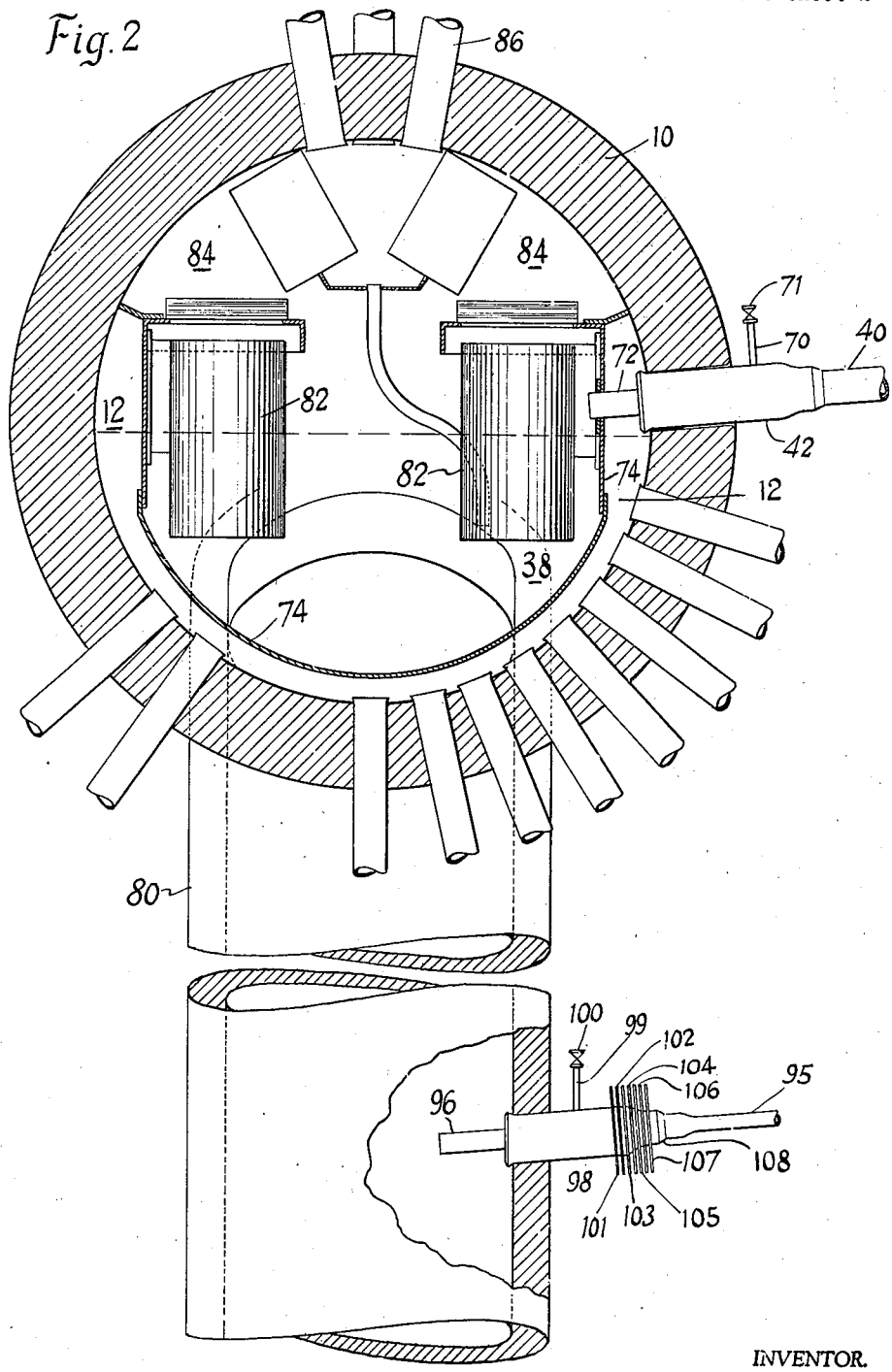

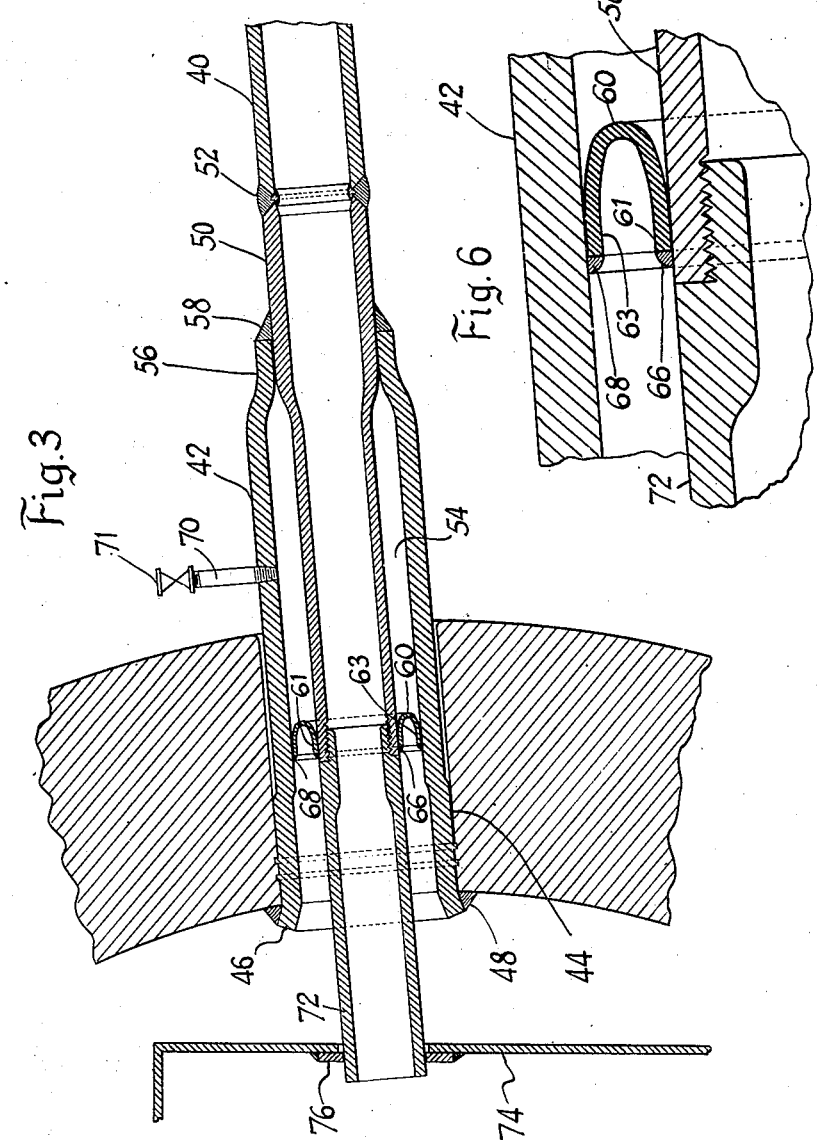

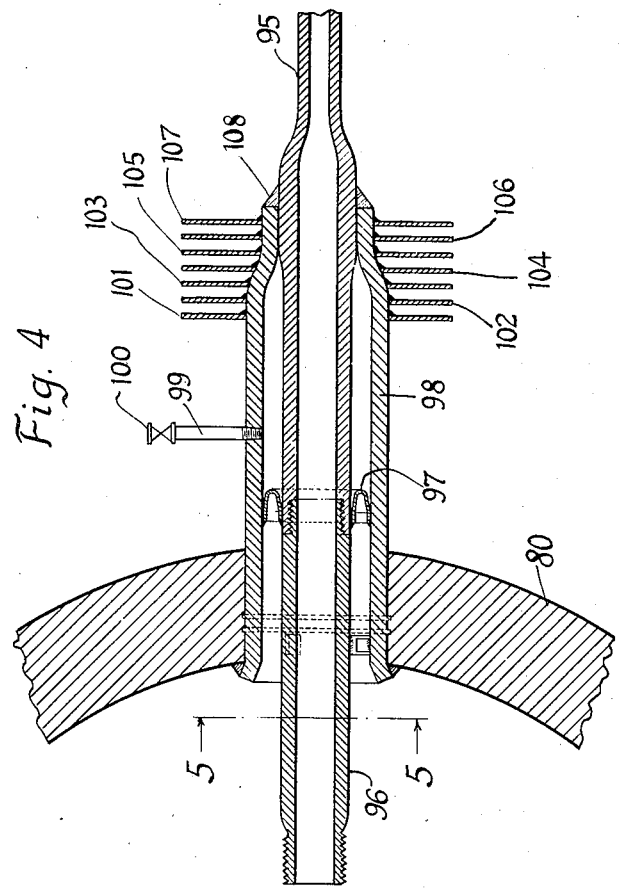
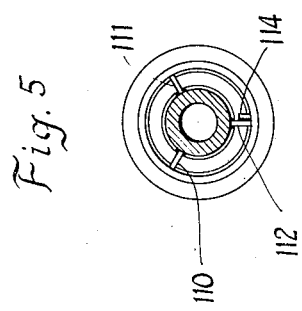

Patented Oct. 19, 1943

2,331,932

UNITED STATES PATENT OFFICE 2,331,932

THERMAL DRUM CONNECTION

Will Haines Rowand, Plainfield, N. J., assignor to The Babcock & Wilcox Company, Newark, N. J., a corporation of New Jersey Application May 28, 1941, Serial No. 395,515

8 Claims. (Cl. 122—365)

This invention relates to fluid heat exchange apparatus such as vapor generators operating at high temperatures and high pressures.

When the steam and water drums or other pressure parts of such installations are subject internally to high fluid pressures they have walls of metal of high tensile strength and of considerable thickness even when the vessel is of moderate diameter, and of equal thickness for lower pressures and larger drum diameters. Conduits or other tubular connections are required to supply fluid to, or withdraw it from, such pressure vessels in service, and the fluid flowing through such connections often has substantially lower or higher temperature than that contained in the pressure vessel. If the tube is steadily conveying a fluid to the drum and the flowing fluid is colder than the main body of fluid within the vessel, the tube metal will contract relative to that of the vessel and damage to the connection will result. A tube expanded into a tube seat in the vessel wall will act this way. In such a joint, and under these steady conditions, there will be a flow of heat from the hotter metal of the vessel wall to the colder metal of the tube in contact with it, so that the metal of the tube at this zone will not be as cold as the fluid flowing inside of it. However, if the fluid entering through the tube, suddenly becomes colder than that in the vessel, especially if, at the same time its flow rate also increases, then the tube metal will suddenly cool and contract because of lack of time for heat flow from the vessel wall to the tube metal to compensate, and leak conditions will result. Under high pressures such conditions are apt to be aggravated and may become permanent because of the erosive effect of such escaping fluid on the surrounding metal.

When the fluid entering the drum is much hotter or much colder than the fluid in the vessel there is a temperature gradient and a local heat flow in the metal of the vessel wall around the tube. When the metal of the vessel wall is colder at the tube seat than at a distance from it, the metal at the tube seat is contracted relative to that at a distance, and thus a tension stress is set up, more severe, the greater the radial temperature gradient, that is, the greater the temperature difference per inch of distance. Such tension stresses may exceed the resistance of the metal and produce cracks. Contrariwise as to temperature difference, a higher temperature in the flowing fluid will cause the metal of the vessel wall to expand at the tube seat relative to the metal at a distance, and a crushing stress will be set up, which may exceed the metal resistance, and cracks in the drum metal are apt to result later when the metal cools.

Such stresses beyond the elastic limit of the metal are serious, and may be more serious than the leaks due to relative expansion of the two metals at a joint. Some joints between the metal of the tube and that of the vessel wall are of the metallically integral type produced for example by fusion welding. Relative expansion of the two metals thus joined may result in an excessive stress in the junction metal and cause the joint to fail, independent of damage to the metal of the vessel wall or that of the tube. Such failures are doubly serious as to the operativeness and safety of such structures.

It is an object of the present invention to provide a drum and tube connection which will avoid such undesirable results.

The invention will be described with reference to preferred embodiments which are indicated in the accompanying drawings, and other objects of the invention will appear as the accompanying description proceeds.

In the drawings:

Fig. 2 is a vertical transverse section of the drum of the Fig. 1 boiler. This view shows the drum connections including the large diameter downcomer communicating with the water space of the drum;

Fig. 3 is a longitudinal section through the illustrative drum and economizer connection;

Fig. 4 is a longitudinal section through a chemical feed connection in communication with the downcomer as indicated in Figs. 1 and 2;

Fig. 5 is principally an elevation of the Fig. 4 chemical feed connection, showing the intake extension in section on the line 5—5 of Fig. 4; and Fig. 6 is a section showing the seal ring construction of Fig. 3 on an enlarged scale.

Figure 1:
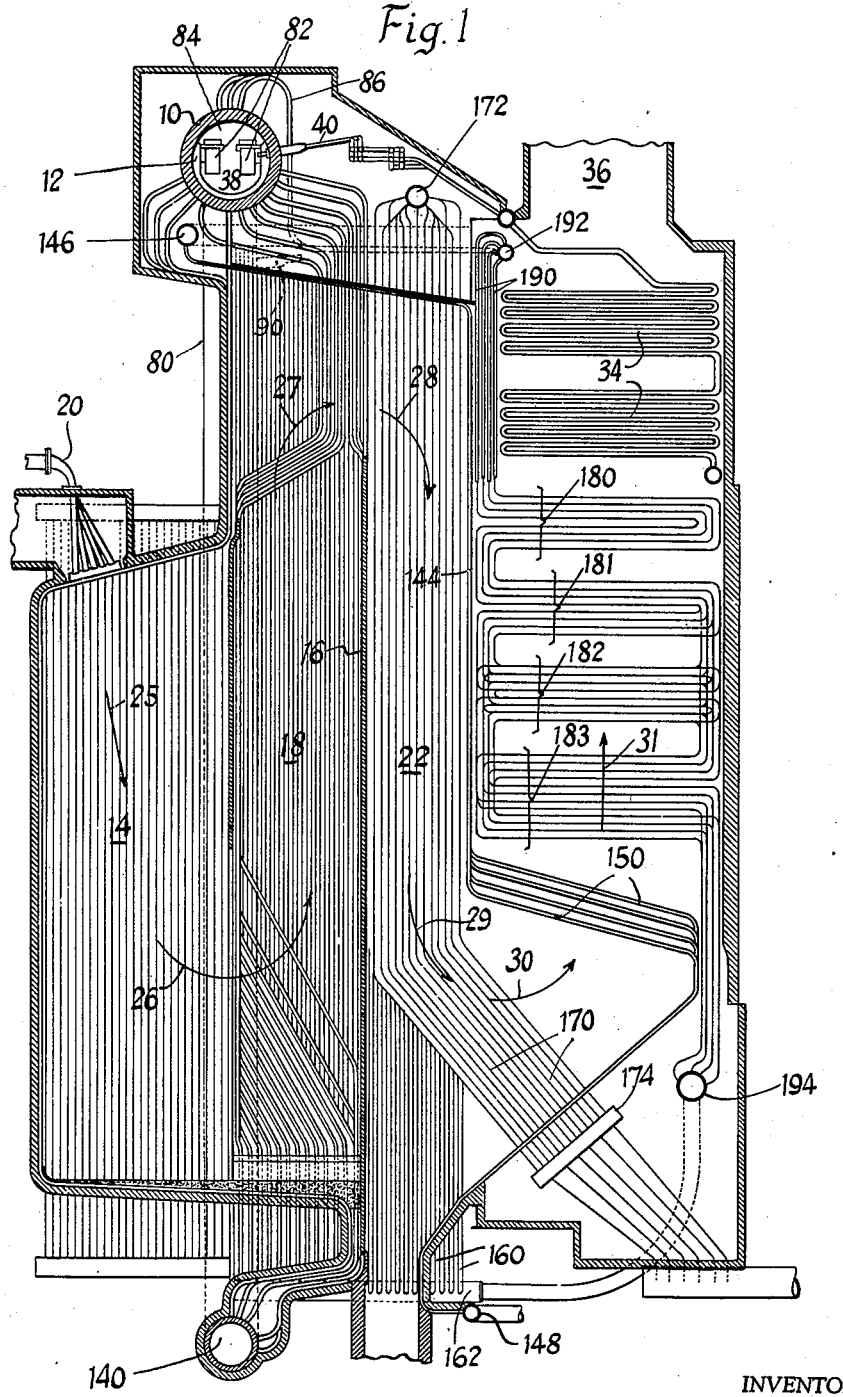
Fig. 1 shows a high pressure steam boiler with which the illustrative economizer and drum connection is associated.
Figure 1:

Fig. 1 indicates a steam generator for the production of 300,000 to 450,000 lbs. of steam per hour at pressures in excess of 2300 lbs. per square inch and at temperatures in excess of 940° F. To withstand such high pressures the 54" I. D. drum 10 has a wall thickness in excess of 8".

The drum compartment 12 receives steam and water mixtures by reason of the communication therewith of the upper ends of steam generating tubes forming the walls of the combustion chamber 14 and the wall 16 of the first open pass 18. The flow of the furnace gases is from the burners 20, through the combustion chamber 14, upwardly through the first open pass 18, downwardly through the second open pass 22, and then upwardly through the convection section, as indicated by the arrows 24—31, inclusive. The furnace gases at the top of the convection section pass over the tubular elements of an economizer 34 and then to the flue 36 leading to an air preheater.

Feed water from the economizer 34 passes through the conduits 40 to the water space 38 of the drum 10 at temperatures as low as 447° F. when the unit is operated at low rates of steam generation, the temperature of the drum metal and the fluid within the drum being of the order of 655-670° F., depending on the exact operating pressure.

One of the connections between a conduit 40 and the drum is indicated in detail in Fig. 3. It includes a sleeve 42 extended through a tube seat opening 44 in the drum 10. This sleeve may be expanded against the drum metal forming the wall of the inner end of the tube seat as shown and it may also have its inner end belled out as indicated at 46. It may be additionally united with the drum metal by a circumferential weld 48.

The sleeve 42 shown in Fig. 3 is of considerably larger diameter than the conduit 40 and the conduit section 50 united with the conduit by the weld 52. Thus, when section 50 is extended into the sleeve 42 there is an annular chamber 54 between these two elements.

The annular chamber 54, as indicated in Fig. 3 of the drawings, is sealed at its outer end by a weld 58 which unites the swaged down portion 56 of the sleeve 42 with the section 50.

At a position near the inner end of the section 50 the annular chamber 54 is closed off by a seal ring 60, of U-section. The inner annular part or inner lip 61 of this ring is welded to the metal of the section 50 as indicated at 66, and the outer annular part or outer lip 63 of the ring is welded to the metal of the sleeve 42 as indicated at 68.

The ring 60 is preferably located at a position exteriorly of the zone in which the metal of the sleeve 42 contacts with the drum metal of the tube seat 44, this arrangement being coordinated with other factors to provide for a temperature gradient such that the metal of the sleeve 42 approximates, at a position to the right of the zone contact between the sleeve and the drum metal, the temperature of the drum metal, while the opposite end of the sleeve approximates the temperature of the incoming fluid.

It is a distinguishing characteristic of the present improvement that the annular chamber 54 is not filled with the liquid or fluid from the drum. In fact, the sealing ring 60 prevents communication between the drum and this annular chamber.

The seal ring 60 is also of such construction that it will maintain a leak proof and pressure tight connection between the elements 50 and 42 in spite of their relative movements resulting from the different temperatures and the different temperature ranges to which they are subjected.

Although another gas or fluid may be circulated through, or otherwise utilized in the annular chamber 54, Fig. 3 shows this chamber to be vented to the atmosphere through the tubular connection 70 and its valve 71.

The annular chamber 54 when filled with air, or when subject to a partial vacuum, and sealed, has a heat insulating effect. It decreases the rate of heat conduction from the hot or drum end of the annular chamber 54 to its cold end under circumstances involving the introduction of a lower temperature fluid to the drum.

The illustrative construction is of particular advantage in high pressure installations because it can be constructed with all joints shop welded (with the exception of the weld 52 which is made in the field), and yet provision is made for differences in expansion of the related tubular parts resulting from operative temperature differentials. The tubular elements 42 and 50 and the seal ring 60 may be welded, in the relationships shown, in the shop, the drum heat-treated, and thereafter the weld 52 made in the field without setting up local stresses in the drum metal.

The seal ring 60 is of such construction that, in spite of the thinness of its material, it will effectively withstand the pressure differential resulting from an operative pressure of 2400 to 2500 lbs. per square inch on one side, and atmospheric pressure on its other side, while providing for the relative axial movement between the tubular element 50 and the outer tubular element 42 resulting from temperature differential.

The inner and outer portions or lips 61—63 of the seal ring 60 initially extend in substantial parallelism with the walls of the tubular elements 50 and 42, respectively, and the pressures carried by the seal ring thus result in stresses of pure tension, although there may be some bending stresses in the curved portion of the ring due to its probable departure from the ideal catenary curve.

The radial dimensions across the two open legs or lips of the seal ring 60, as well as the axial length of the ring (or depth of the U) depend upon the diameter of the inner tube and the temperature differential taken care of between the inner tube and the outer tube. The radial dimension is such as to give the required flexibility.

The extension 72 of the feed water conduit is threaded into the end of the section 50 and the former extends through the wall 74 separating the steam and water compartment 12 from the remainder of the drum. This extension preferably has a sliding fit through an opening provided in a plate 76 secured to the wall 74.

The compartment 12 does not extend the full length of the drum. It terminates in end walls at positions considerably short of the drum ends in order that a downcomer such as 80, at each end of the drum, may communicate with the drum water space 38, exteriorly of the compartment 12.

Steam and water from the compartment 12 passes to the centrifugal separators 82 from which the separated steam is discharged upwardly into the drum steam space 84 and thence through the conduits 86 to a superheater.

Each downcomer 80, receives chemical feed through a tubular connection indicated at 90 in Fig. 1. This connection, as shown in detail in Fig. 4, includes elements 95-130 arranged in a manner quite similar to the arrangement of corresponding elements of the above described economizer and drum connection (Fig. 3). It does, however, include the fins or extended heat transfer annuli 101-107 welded to the outer end of the sleeve 98. These fins dissipate heat through convection transmission to the air, and by radiation from their exposed surfaces.

The Fig. 4 embodiment also includes the spacers 110–112 (Fig. 5) secured to the extension 96 for centering the same within the sleeve 98. One of these spacers is adapted to contact a stop 114 when the extension 96 is being threaded into the end of the conduit 95, thus preventing further turning of the extension.

The flow of chemicals through the tube 95 will be intermittent in character, and inasmuch as there will be nothing to cool down the downcomer connection when no cooler fluid is flowing therethrough, there will be a tendency for heat to be transmitted from the downcomer wall toward the sleeve 98, and also through the inner tube 96 to the position of their welded juncture 108 at the outer end of the air chamber. This heat transmission would result in a saturated temperature for the whole assembly up to that point if it were not for extended surface elements 101–107. These heat dissipating elements maintain the tubular connection at a position remote from the downcomer wall, at a fairly low temperature. Thus, when low temperature chemical feed is resumed from the tube 95 to the downcomer, damaging stress conditions will not be set up.

Aside from the elements above referred to, the steam generator indicated in Fig. 1 includes the lower drum 140 to which the steam generating wall tubes and the downcomers are connected as indicated.

The wall 144 separating the second open pass 22 from the convection section 31 includes the upright portions of steam heater tubes connecting the upper and lower headers 146 and 148, intermediate portions of these tubes forming the screen 150 across the entrance of the convection section.

The side walls of the second open pass 22 may include the tubes 160 of a steam heater connected to a lower header 162 and an appropriate upper header. Furthermore, the second open pass 22 is divided by partition walls including the steam heater tubes 170 connecting the upper header 172 with lower headers such as that shown at 174.

In the convection section there are successive groups 180–183 of tubular loops some of which may be serially connected sections of the steam heater tubes 190 extending from the upper header 192 to the lower header 194.

While, in accordance with the requirements of the statutes (and particularly Sec. 4888 R. S.), the best form of the invention now known to me has been illustrated and described, those skilled in the art will understand that changes may be made in the form of the apparatus without departing from the spirit of the invention covered by the claims, and that certain features of the invention may sometimes be used to advantage without a corresponding use of other features.

I claim:

1. A tubular connection for a high pressure drum including two concentrically arranged tubular elements welded together at a position remote from the drum and forming thereby an annular pressure chamber, said tubular elements being normally subject to widely different temperatures, the outer element being secured in pressure-tight relation to the drum in a tube seat therein, and a flexible and elastic metallic ring of channel cross-section bridging the annular space between said tubular elements and welded in pressure-tight relationship to both to divide the annular pressure chamber between said elements into two sub-chambers one of which is open to the drum and subject to its higher pressure while the other sub-chamber is subject to a lower pressure, the channel of the ring opening toward the sub-chamber under the drum pressure.

2. In a fluid system, a pressure vessel or drum formed with a tube seat therein, a conduit for supplying the drum with fluid at a temperature different from the temperature of the fluid within the drum, a connecting member joining the drum metal at the tube seat with the conduit at a position externally of the drum and substantially spaced therefrom, said connecting member being of a diameter considerably greater than that of the conduit, and a seal ring of a channel cross-section within said member and secured to the conduit and the member to maintain an annular insulating space out of communication with the drum space, the channel of the seal ring opening axially or longitudinally of the connecting member.

3. In tubular pressure apparatus, an inner metallic tube of circular section, a concentric outer metallic tube of circular section spaced from and enclosing the inner tube, the outer tube being subject to temperature conditions different from those affecting the inner tube, and an elastic annular metallic member of U-section bridging the annular space between the tubes and having its two edges welded to the inner and outer tubes, the annular member separating two annular spaces under different pressures and having its channel opening toward the space under the higher pressure.

4. In tubular pressure apparatus, an inner metallic tube of circular section, a concentric outer metallic tube of circular section spaced from the inner tube and enclosing at least a part of the inner tube, and a flexible and elastic metallic ring of channelled section bridging the annular space between the tubes so as to separate two annular chambers subject to different pressures, the ring having its two edges welded to the inner and outer tubes and its channel opening axially of the tubes or toward one side of the ring and toward the annular chamber subject to the higher pressure.

5. In a fluid system, a pressure vessel formed with a tube seat therein, a conduit for the supply of fluid at a temperature different from the temperature of the fluid within the drum, a sleeve of an inside diameter greater than the outside diameter of the conduit joining the pressure vessel about the tube seat with the conduit at a position externally of the pressure vessel, the fluid in the pressure vessel having access to the inside of the sleeve for a limited part of its length, an extension of the conduit within the sleeve and spaced therefrom so as to form an annular chamber from which the fluid flowing through the conduit is excluded, the length of the sleeve being sufficient to maintain a metal temperature gradient between its ends of the range of the temperature difference between the fluid within the pressure vessel and the fluid passing through the conduit, and a seal ring of channelled cross-section disposed between the conduit and the sleeve at a position intermediate the ends of the sleeve, said ring being welded along its inner edge to the conduit and welded along its outer edge to the sleeve to form an annular insulation chamber maintained out of communication with the fluid within the pressure vessel.

6. In a water tube steam boiler, a drum for steam and water at high pressures and high temperatures, a conduit in communication with the drum for the flow of water into the drum at temperatures materially less than the temperature of the fluid within the drum, and thermal gradient means including a sleeve circumscribing the conduit and in contact with the main body of fluid within the drum and having metal-to-metal contact with the conduit in a zone outwardly remote from the drum wall, said means establishing such a thermal gradient from said zone to the drum metal that the metal of the sleeve adjacent the drum closely approaches the temperature of the fluid within the drum, the thermal gradient means including an elastic metallic ring having wide inner and outer annular marginal portions joined by an angularly related connecting portion of substantial extent, the outer annular marginal portion extending inwardly at a small acute angle to the interior surface of the sleeve to which it is welded and the inner annular marginal portion being similarly related to the conduit.

7. In a fluid system, a pressure part subject internally to high fluid pressures and having a tube seat therein, a sleeve secured to said part at the tube seat and projecting exteriorly thereof, a conduit extending through the sleeve and arranged for the flow into said part of a fluid at a temperature materially differing from the temperature of the fluid within said part, means joining the conduit and the sleeve at a position remote from said part, and a seal ring between the conduit and the sleeve and formed as an annular channel the sides of which extend at small acute angles to the conduit and the sleeve respectively and have their outer edges welded thereto, the seal ring completing an annular thermal insulation chamber around the conduit.

8. In tubular pressure apparatus, an inner metallic tube of circular section, a concentric outer metallic tube of circular section spaced from the inner tube and enclosing at least a part of the inner tube, and a flexible and elastic metallic ring of channelled section bridging the annular space between the tubes at a position spaced from the ends of the tubes so as to separate two annular chambers between the tubes, the ring having its inner and outer sides welded respectively to the inner and outer tubes and its channel opening axially of the tubes or toward one side of the ring.

WILL HAINES ROWAND.